US007204010B2

(12) United States Patent
Germanton

(10) Patent No.: US 7,204,010 B2
(45) Date of Patent: Apr. 17, 2007

(54) METHOD OF MAKING A LOAD SENSOR PLATE

(75) Inventor: Damon Germanton, Kinnelon, NJ (US)

(73) Assignee: Measurement Specialties, Inc., Hampton, VA (US)

( * ) Notice: Subject to any disclaimer, the term of this patent is extended or adjusted under 35 U.S.C. 154(b) by 79 days.

(21) Appl. No.: 10/833,539

(22) Filed: Apr. 28, 2004

(65) Prior Publication Data

US 2005/0241415 A1     Nov. 3, 2005

(51) Int. Cl.
*G01R 3/00*     (2006.01)
(52) U.S. Cl. .............................. 29/595; 29/825; 29/827
(58) Field of Classification Search ................ 29/827, 29/825, 595
See application file for complete search history.

(56) References Cited

U.S. PATENT DOCUMENTS

| 4,548,086 | A | | 10/1985 | Kastel | 73/862.65 |
| 4,656,454 | A | * | 4/1987 | Rosenberger | 338/2 |
| 4,673,837 | A | * | 6/1987 | Gingerich et al. | 310/239 |
| 4,733,455 | A | * | 3/1988 | Nakamura et al. | 29/603.06 |
| 4,783,908 | A | * | 11/1988 | Pabst | 34/273 |
| 4,993,506 | A | | 2/1991 | Angel | 177/211 |
| 5,263,241 | A | * | 11/1993 | Hart et al. | 29/827 |
| 5,345,670 | A | * | 9/1994 | Pitzele et al. | 29/606 |
| 5,377,403 | A | * | 1/1995 | Hart et al. | 29/827 |
| 5,963,028 | A | * | 10/1999 | Engel et al. | 324/207.2 |
| 6,417,466 | B2 | | 7/2002 | Gross et al. | 177/211 |

* cited by examiner

*Primary Examiner*—Carl J. Arbes
(74) *Attorney, Agent, or Firm*—Plevy, Howard & Darcy, PC

(57) ABSTRACT

A load sensor plate (100) is adapted for manufacture by stamping spaced apart openings (110) through a thin blank to define flexure beams (112) beside the openings (110); and forming the blank with spaced apart columnar walls (102), (106) joined by a web (104) having the openings (110) and the flexure beams (112) whereby, an applied load (116) exerted on one of the columnar walls (102) is distributed among the flexure beams (12), and another of the columnar walls (106) bears an opposing force (118) that resists the applied load (118).

10 Claims, 4 Drawing Sheets

METHOD OF MAKING A LOAD SENSOR PLATE

FIELD OF THE INVENTION

The invention relates to a sensor plate for electronic measurement of an applied load, such as, the weight of an object. The sensor plate has flexure beams that undergo strain in response to the applied load.

BACKGROUND

The invention relates to a sensor plate for electronic measurement of an applied load, such as, the weight of an object. The load is applied to the sensor plate, causing the sensor plate to undergo resilient strain in proportion to the applied load. One or more electronic sensors are permanently affixed on the sensor plate to sense the strain. Each of the sensors produces an electrical signal that varies in proportion to the strain. The signal can be electronically calibrated to indicate the amount of the load. For example, the sensor plate is deployed in a platform scale to sense the weight of an object, and produce a calibrated reading of the weight. Further, for example, the sensor plate is deployed in a microwave oven to weigh a quantity of food, and to produce calibrated adjustments of power level and duration of a microwave energy output to defrost and/or cook the food. A platform scale and a microwave oven are but examples of many different devices that deploy a sensor plate. What is needed is a sensor plate that would be adapted for use in many different devices. Further, a desirable sensor plate would be of compact construction having a minimum parts count.

U.S. Pat. No. 6,417,466 discloses a sensor plate that is machined to shape the sensor plate with narrow flexure beams. When a load is applied to the sensor plate, the strain becomes concentrated in each narrow flexure beam. A sensor plate made by machining is more costly than a sensor plate made by a stamping and forming operation, also referred to as coining.

Each of U.S. Pat. Nos. 4,548,086 and 4,993,506 discloses a sensor plate that is made from one flat piece, which is suitable for stamping and forming, also referred to as coining. One disadvantage of a flat piece sensor plate is that it does not self-limit the strain imposed by an excessive applied force. Accordingly, the flat piece will undergo inelastic deformation in response to an excessive applied force, and will become permanently deformed. It would be advantageous for a sensor plate that is ideally suitable for stamping and forming, also referred to as coining, and which self-limits the strain in response to an excessive applied force.

According to U.S. Pat. No. 4,993,506 one portion of the sensor plate is required to be attached by screws to a weighing scale apparatus, and another portion of the sensor plate is installed on a weighing platform with raised pads that adhesively secure to the weighing platform and further, that are snap fit onto the sensor plate. This sensor plate requires direct connections to different parts of a weighing scale apparatus. It would be advantageous for a sensor plate that is adapted for drop-in assembly, instead of direct connections to different parts of an apparatus in which it is installed.

Further, according to U.S. Pat. No. 4,993,506, the sensor plate has U-shaped members. This construction requires that an applied load must be summed among smaller forces that are divided among the tips of the U-shaped members to deflect the same. The sensor plate would inaccurately sense the sum of the forces when the forces are directed off-axis to the direction of deflection of the tips. It would be desirable for a sensor plate to not require multiple locations on the sensor plate for receiving an applied load.

U.S. Pat. No. 4,548,086 discloses a push rod that impinges against the sensor plate. The push rod positions the applied load to a precise location on the sensor plate. The push rod is supported in its own housing piece. Accordingly, the push rod and its housing piece increase the parts count and require a construction of increased height, due to the length of the push rod. It would be advantageous for a sensor plate that would not need a push rod.

SUMMARY OF THE INVENTION

The present invention is a sensor plate for a load cell. The sensor plate has an inner columnar wall and an outer columnar wall. Flexure beams extend in respective directions from the inner columnar wall toward the outer columnar wall. The inner columnar wall forms an inner clamp for each of the flexure beams and transmits an applied load to the flexure beams. The outer columnar wall forms an outer clamp for each of the flexure beams, and an opposing force is borne by the outer columnar wall to resist the applied load.

According to an embodiment of the invention, strain detecting sensors on the flexure beams detect strain in the flexure beams, and convert the strain to respective electrical signals.

The inner columnar wall and outer columnar wall are unitary with the flexure beams to constitute an advantageous construction that is suitable for fabrication by stamping and forming, also referred to as coining. Further, the inner columnar wall transmits an applied load, which eliminates a need for a push rod, and eliminates a need for U-shaped members to receive the applied load at the tips of the U-shaped members.

According to another embodiment of the invention, the inner columnar wall is a side of a cup. The cup is advantageously formed by being drawn in a stamping and forming operation performed by a stamping apparatus consisting of stamping and forming dies in a stamping press.

According to a further embodiment of the invention, a bottom of the cup is formed with a projection, which receives an applied force, and which translates an off axis applied force into an on-axis force that is applied to the flexure beams.

According to an embodiment of the invention, the sensor plate is of one piece construction. The one piece construction has flexure beams in a web that extends between spaced apart, load bearing columnar walls.

According to a further embodiment of the invention, a series of openings extend through the web, and the flexure beams are portions of the web beside the openings. The web and the openings through the web are suitable for fabrication by stamping and forming, also referred to as coining.

According to another embodiment of the invention, a receptacle for the load cell has a load bearing wall that impinges against the outer columnar wall to resist the applied load. The advantage of this embodiment is that the load bearing wall can surround the sensor plate without a need for enclosing the sensor plate. Alternatively, the load bearing wall is part of a housing that encloses the sensor plate.

The invention further relates to a load cell having a sensor plate in a receptacle for the sensor plate. The sensor plate is suitable for fabrication by stamping and forming, also referred to as coining. Accordingly, the load cell can be referred to as a "coin cell". The receptacle adapts the sensor plate for drop-in assembly, without requiring the sensor plate to be connected to different parts of an apparatus that uses the sensor plate.

DETAILED DESCRIPTION

Figure 1A:
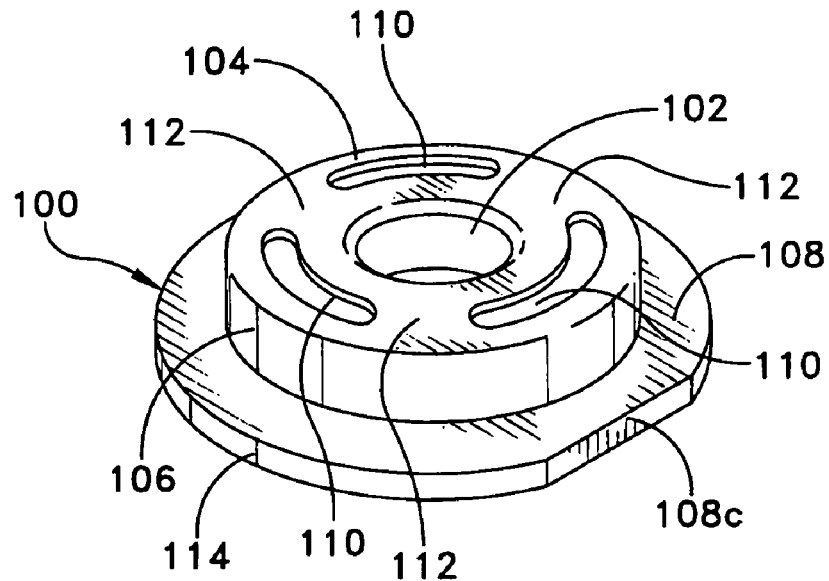
FIG. 1A is an isometric view of a sensor plate.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

FIG. 1A discloses a sensor plate (100) for a load cell. The sensor plate (100) is fabricated with an inner columnar wall (102) that circumferentially encircles a central space at the central axis (102a), FIG. 2, of the sensor plate (100). Although the wall (102) is shown in FIG. 1A as being curved, the wall (102) can have flat portions. Although the wall (102) is shown in FIG. 1A as being continuous, the wall (102) can be discontinuous. The inner columnar wall (102) joins a unitary circumferential web (104), in turn, that joins an outer columnar wall (106). Although the wall (106) is shown in FIG. 1A as being curved, the wall (106) can have flat portions. Although the wall (106) is shown in FIG. 1A as being continuous, the wall (106) can be discontinuous. The circumferential web (104) and outer columnar wall (106) are concentric with the central axis (102a). The outer columnar wall (106) has a concentric outer lip flange (108).

FIG. 1A further discloses a series of openings (110) through the web (104). The sensor plate (100) further has flexure beams (112) next to the openings (110), and in the web (106). The beams extend radially from the central axis (102a) in respective directions from the inner columnar wall (102) toward the outer columnar wall (104). Each flexure beam (112) is defined between a pair of spaced apart openings (110). The width of each flexure beam (112) is controlled by the width between a corresponding pair of the openings (110). For a web (104) of known thickness, also referred to as a given thickness, the width of each flexure beam (112) is selected to determine its range of resilient strain in response to an applied load. A wide width has a higher range of resilient strain than does a narrow width. A higher range of applied loads matches well with each flexure beam (112) of relatively wide width. Conversely, a lower range of applied loads matches well with each flexure beam (112) of relatively narrow width. Further, the number of flexure beams (112) is controlled by the number of spaced apart openings (110). A minimum two openings (110) are required to define one flexure beam (112). The second beam (112) and each beam (112) thereafter is defined by a corresponding additional opening (110), in addition to the minimum two openings (110).

The sensor plate (100) has a construction that is suitable for fabrication by stamping and forming, also referred to as coining. A brief discussion of an industry known, stamping and forming operation will now follow. A stamping and forming operation is performed by an industry known stamping press that opens and closes a pair of stamping dies. One of the stamping dies is on an anvil of the stamping press. Another of the stamping dies is on a reciprocating ram of the stamping press. The ram reciprocates toward and away from the anvil, respectively closing and opening the stamping dies. A thin strip, also referred to as a blank, is stamped and formed between the stamping dies. The blank is indexed into position between the pair of stamping dies which are open, i.e., separated from each other during an upstroke of the stamping press ram. By a down stroke of the ram, the stamping press forcefully closes the stamping dies against opposite sides of the blank. The stamping dies have die tooling that shape the blank. A progressive die comprises a progression of multiple die stations, with different die tooling at the die stations. When the stamping press closes the stamping dies, the tooling at a first die station stamps and forms the blank. Then the stamping press opens the stamping dies, and the blank is indexed from one progressive die station to the next die station. When the stamping press closes the stamping dies, the blank, which has been indexed to the next die station, is further stamped and formed by the tooling at the next die station. Thereby, progressive dies are useful to shape the blank with bends, to cut openings through the blank and to cut the blank away from a shaped periphery of an object or article that is made from the blank. Multiple die stations may be required to shape the blank incrementally, to avoid excessive deformation or fracture of the blank by the tooling. The sensor plate (100) is made by stamping and forming a blank in a progressive die. Different stamping and forming method steps will be discussed in making the sensor plate (100). The stamping and forming method steps are performed in any successive order, and are not limited to the order in which they are discussed hereafter.

With further reference to FIG. 1A, the sensor plate (100) is of thin metal construction. Further, the sensor plate (100) is of one piece construction. The construction of the sensor plate (100) is suitable for fabrication by stamping and forming in a progressive die. The sensor plate (100) begins as a thin blank of metal. The blank may be a continuous strip or a smaller blank. According to an embodiment of the invention, the blank is drawn transversely of its thickness to bend into the shape of the sensor plate (100). A drawing operation refers to a combined, stretching of the blank and bending of the blank, so as to form the inner columnar wall (102) and the web (104) and the outer columnar wall (106) and the outer lip flange (108) as continuous and progressive circumferential shapes. Several progressive die stations may be required to incrementally draw the blank to form a desired shape, while avoiding fracture of the blank. The web (104) remains joined to both the inner columnar wall (102) and the outer columnar wall (106).

With further reference to FIG. 1A, the blank is stamped and formed in the progressive die to provide the openings (110) through the web (104), for example, by stamping to punch out a section of the web (104) to form each opening (210). Thereby, the flexure beams (112) are fabricated in the web (104) next to the openings (110). According to one embodiment of the invention, a stamping method step to form one or more openings (110) is preferably performed at the last stage in the progressive die or tooling. However, the stamping method step can be performed earlier in a sequence of stamping and forming method steps. Further, it would be desirable to change the widths of the flexure beams (112) to change the range of beam deflection in response to an applied force. The change is readily accomplished by changing the size of the openings (110), i.e., the widths of the openings (110) by a corresponding change in the progressive die.

Figure 1B:
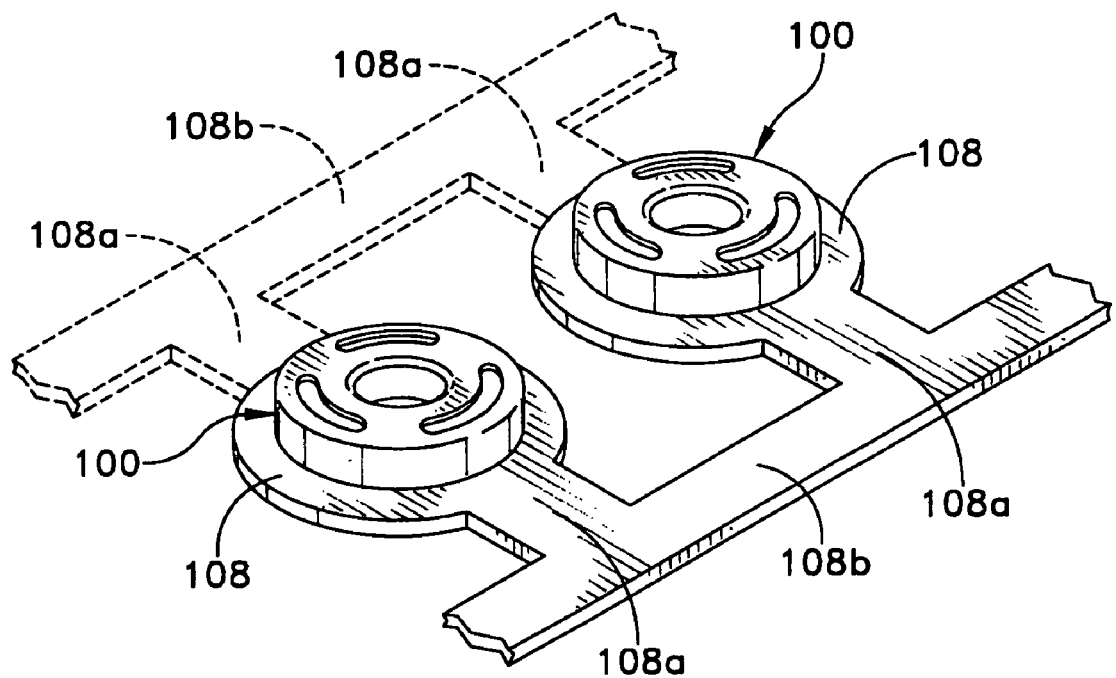
FIG. 1B is an isometric view of a series of sensor plates on a strip.

The blank is stamped in a progressive die to cut out an outer circumferential periphery (114) of the sensor plate (100) at the edge of the lip flange (108). As disclosed by FIG. 1B, a portion (108a) of the lip flange (108) can remain temporarily attached to the blank, particularly when the blank is a ribbon-like continuous strip (108b). The continuous strip (108b) is used to index the blank through the progressive dies from one station to the next station. Thus, the continuous strip (108b) connects a series of sensor plates (100) that have been fabricated by indexing the blank through the stations of the progressive dies. According to a preferred embodiment of the invention, a second ribbon-like continuous strip (108b) is illustrated in FIG. 1B by broken lines. The second continuous strip (108b) is parallel to the first continuous strip (108b) and is temporarily attached by portions (108a) to the blank. Both continuous strips (108b) are used to index the blank through the progressive dies from one station to the next station. Each sensor plate (100) is separated by severing from each of the portions (108a). Severing can be accomplished at the last stage of a progressive die. Alternatively, the sensor plates (110) can remain attached to one or both continuous strips (108b) and wound onto a reel for transport or storage. An alternative embodiment of an individual sensor plate (100) has a flat section (108c) that orients the sensor plate (100) and keeps it from rotating about its central axis (102a), as would a flat section on a wheel. For example, the flat section (108c) can be formed when the sensor plate (100) is cut away from the portion (108a) of the lip flange (108) to provide an individual sensor plate (100).

Figure 2:
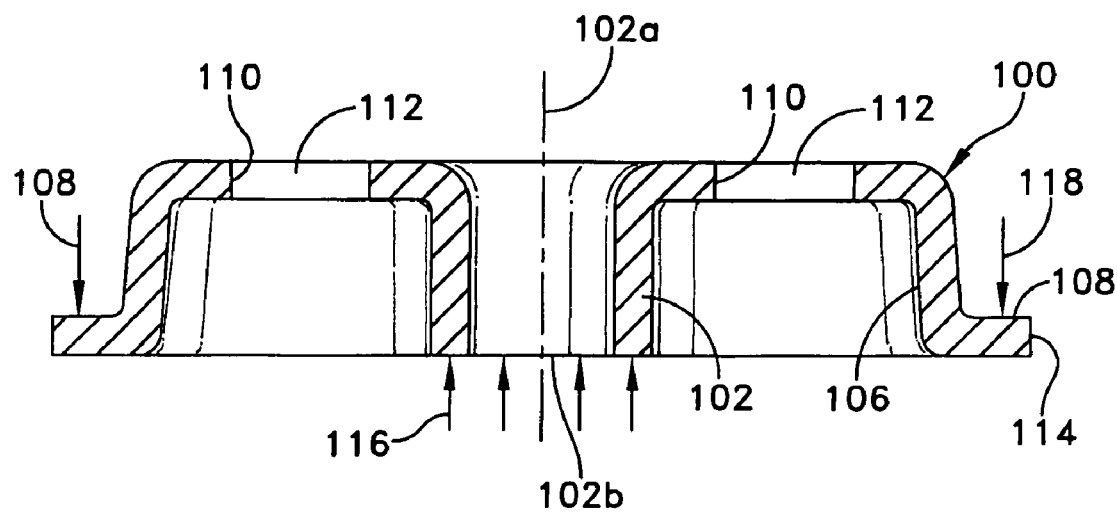
FIG. 2 is a section view of the sensor plate disclosed by FIG. 1A.

With reference to FIG. 2, the inner columnar wall (102) along its edge has a base (102b), which receives a distributed, applied load (116). The applied load (116) is resisted by an opposing force (118) exerted against the lip flange (108) on the outer columnar wall (106). The sensor plate (100) operates by having each of the flexure beams (112) undergo strain due to the opposite ends of the flexure beams (112) being clamped, respectively, by the inner columnar wall (102) and the outer columnar wall (106).

The applied load (116) is applied in a direction that extends parallel to the central axis (102a) of the sensor plate (100). The inner columnar wall (102) is strengthened by being bent to extend its thickness plane parallel to the direction of the applied load (116). Thus, the inner columnar wall (102) defines a load bearing column that bears the applied load (116). The applied load (116) is transmitted lengthwise along the thickness plane of the inner columnar wall (102), and becomes distributed among the number of flexure beams (112). The web (104) and the flexure beams (112) extend radially away from the central axis (102a), and bridge between the inner columnar wall (102) and the outer columnar wall (106). Similarly, the outer columnar wall (106) is strengthened by being bent to extend its thickness plane parallel to the direction of the applied load (116), and thereby, parallel to the direction of the distributed, opposing force (118). Thus, the outer columnar wall (106) is a load bearing column that bears the opposing force (118). The opposing force (118) is transmitted lengthwise along the thickness plane of the outer columnar wall (106), and resists the applied load (116) that is distributed among the number of flexure beams (112).

Figure 3:
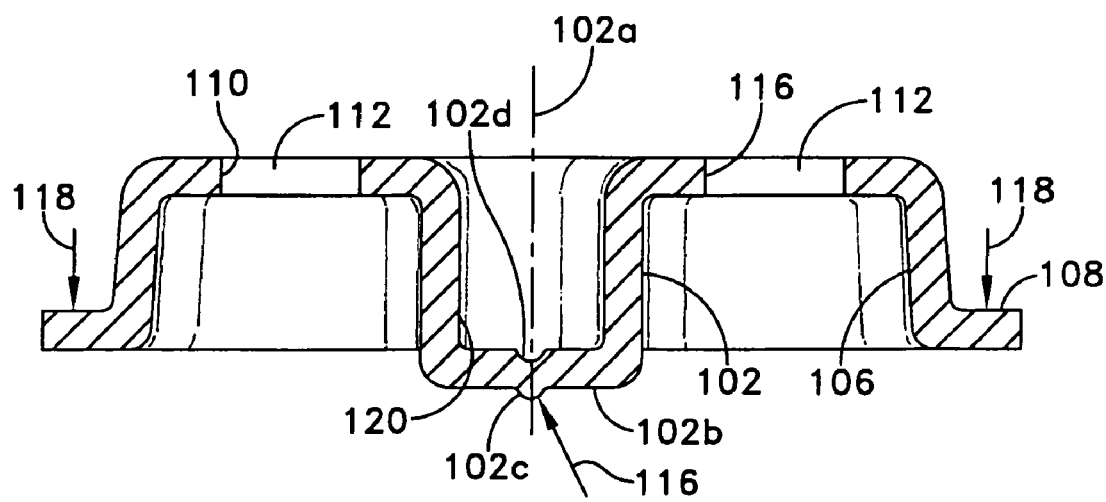
FIG. 3 is a section view of another embodiment of the sensor plate disclosed by FIG. 1A.

FIG. 3 discloses another embodiment of the sensor plate (100). In the embodiment disclosed by FIG. 3, the base (102b) forms a bottom of a cup (120), and the inner columnar wall (102) forms the sides of the cup (120). The base (102b) has a central projection (102c) on the axis (102a) that projects outwardly to receive the applied load (116). The applied load (116) is applied against the central projection (102c) for even distribution among the flexure beams (112). When the applied load (116) is off-axis, meaning, that the direction of the applied load (116) is not parallel to the central axis (102a), nevertheless, the thickness plane of the inner columnar wall (102) transmits the applied load (116) parallel to the axis (102a), thereby providing on-axis compensation of the off axis, applied load (116). A detent (102d) in the base (102b) is fabricated by a stamping and forming method step. The detent (102d) forms the projection (102c) on the exterior of the base (102b).

Figure 4A:
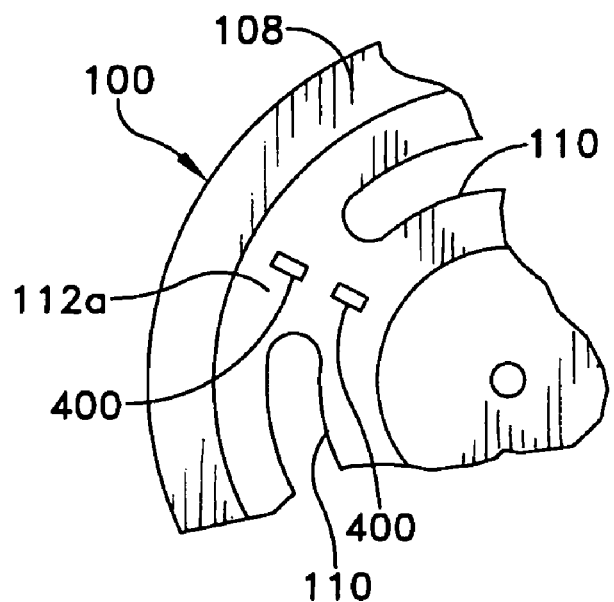
FIG. 4A is a fragmentary view of sensors on a portion of the sensor plate disclosed by FIG. 1A.

With reference to FIG. 4A, strain detecting sensors (400) on the flexure beams (112) detect the strain and produce respective electrical signals. The load plate (100), at least the flexure beams (112) thereof, are coated with a thin film of electrical insulation (112a), for example, a glass frit or a non-conducting epoxy. The sensors (400) are electrically isolated from the flexure beams (112) by being on the thin film of insulation (112a). Each of the flexure beams (112) undergoes elastic strain when the applied load (116) is transmitted by the inner columnar wall (102) to the flexure beams (112), and when the applied load (116) is resisted by the opposing force (118). The strain detecting sensors (400) detect the strain of the flexure beams (112) under load, and produce respective electrical signals in direct proportion to the strain. For example, the sensors (400) are piezoresistive elements (400) applied by silk screening fabrication apparatus and methods, or by semiconductor fabrication apparatus and methods. Industry standard silk screening fabrication, or alternatively, semiconductor fabrication, can mass produce the piezoresistive elements (400) in situ, with a high degree of accuracy and miniaturization. For example, the piezoresistive elements (400) comprise a semiconductor resistor material that is silk screened in situ with precisely controlled dimensions of length, width, thickness and placement on the flexure beams (112), such that the sensors (400) have precise electrical resistances.

According to an embodiment of the invention errors in detecting resilient strain are reduced by the flexure beams (112) being clamped in a double cantilever configuration. The double cantilever configuration operates in the following manner. The applied load (116) is transmitted by the inner columnar wall (102) to a first end of each flexure beam (112). The load (116) is resisted by the opposing force (118) transmitted by the outer columnar wall (106) to a second end of each flexure beam (112). A region of each flexure beam (112) near the first end will be in comprression. An adjoining region near the second end will be in tension. The first region and the second region adjoin each other whereat the compression switches to tension. By securing two sensors (400) opposite each other where compression and tension switch, the sensors will detect, i.e., measure, the tension strain and compression strain, respectively, and will produce respective electrical signals of opposite polarity, to minimize signal errors.

Figure 4B:
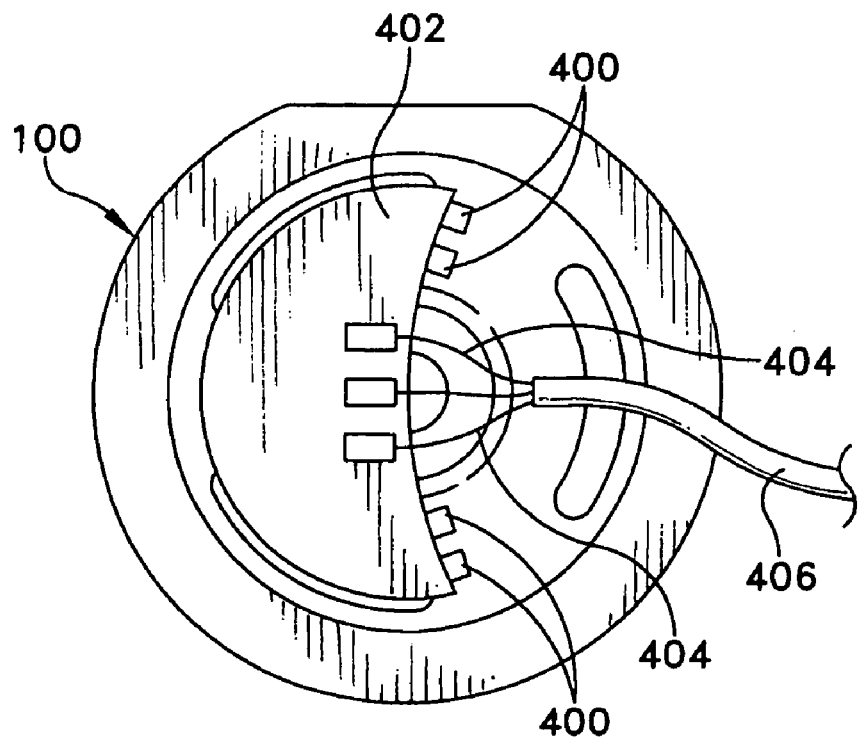
FIG. 4B is a plan view of a circuit board and electrical cable with the sensor plate disclosed by FIG. 1A.

FIG. 4B discloses a circuit board (402) attached to the exterior of the sensor plate (100) with insulative filler adhesive. The circuit board (402) has an electrical, balanced bridge circuit, for example, as described in U.S. Pat. No. 4,548,086, incorporated herein by reference, in which the sensors (400) are resistors in the bridge circuit. The bridge circuit output on the circuit board (402) is connected to respective electrical leads (404) or insulated wires of an electrical cable (406). The electrical cable (406) connects to an integrated circuit IC signal processor, not shown, which converts the electrical signals of the sensors (400) to a digital readout indicating the value of the applied load (116).

Figure 5A:
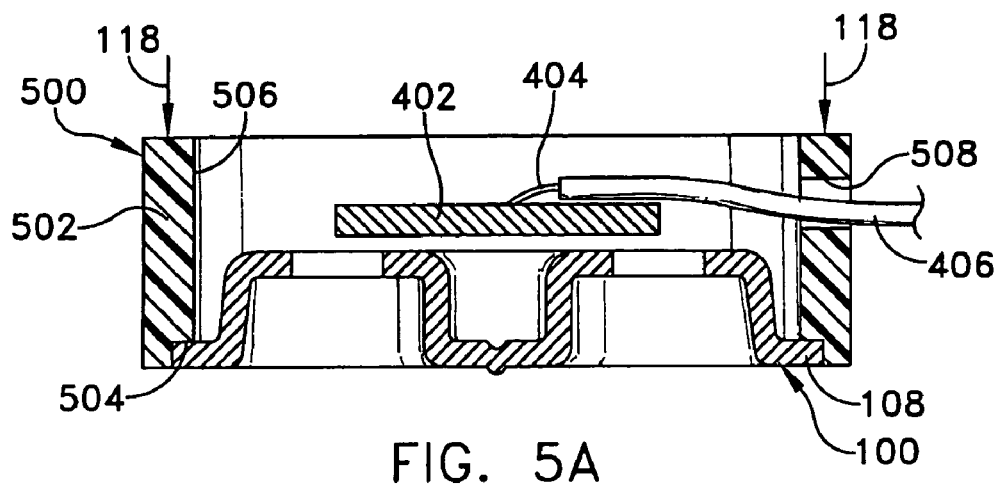
FIG. 5A is a section view of a sensor plate disclosed by FIG. 4B with one embodiment of a receptacle.

FIG. 5A discloses an embodiment of a receptacle (500) of insulating material encircling the sensor plate (100) and circuit board (402). The receptacle (500) in FIG. 5A has a circumferential load bearing wall (502) with a stepped, recessed end (504) nesting the lip flange (108) of the sensor plate (100) and distributing the opposing force (118) against the lip flange (108). The receptacle (500) has an opening (506) through the opposite end, and an open slot (508) through the wall (502). The electrical cable (406) extends either through the slot (508), as shown in FIG. 5A, or through the opening (506). The wall (502) of the receptacle (500) extends beyond the outer columnar wall (106) to receive the opposing force (118). Thereby, the wall (502) protects the circuit board (402) and the sensors (400) and the flexure beams (112). The load bearing columnar wall (102) is exposed from the receptacle (500) to receive the applied load (116). The receptacle (500) receives the opposing force (118). Thus, the sensor plate (100) is a self-contained unit adapted to detect the applied load (116) as a drop-in assembly, without having to be attached to different parts of an apparatus in which it is installed.

Figure 5B:
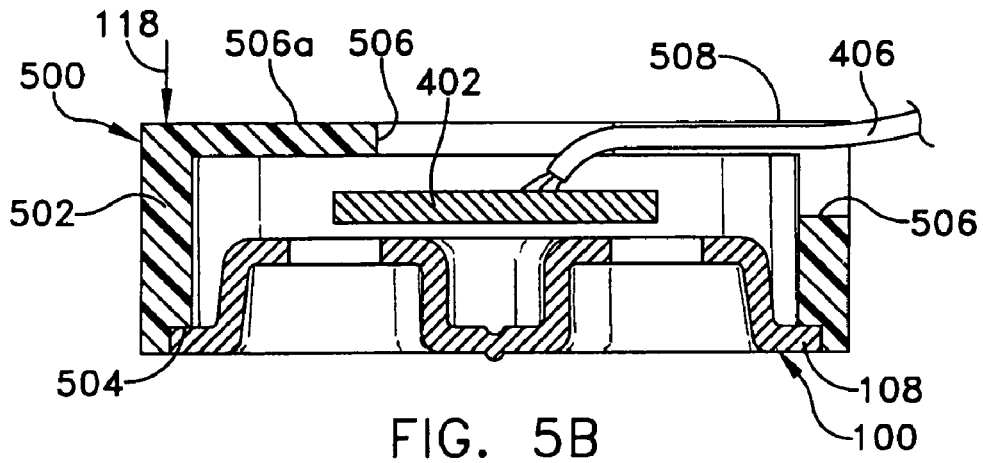
FIG. 5B is a section view of a sensor plate disclosed by FIG. 4B with another embodiment of a receptacle.
Figure 5C:
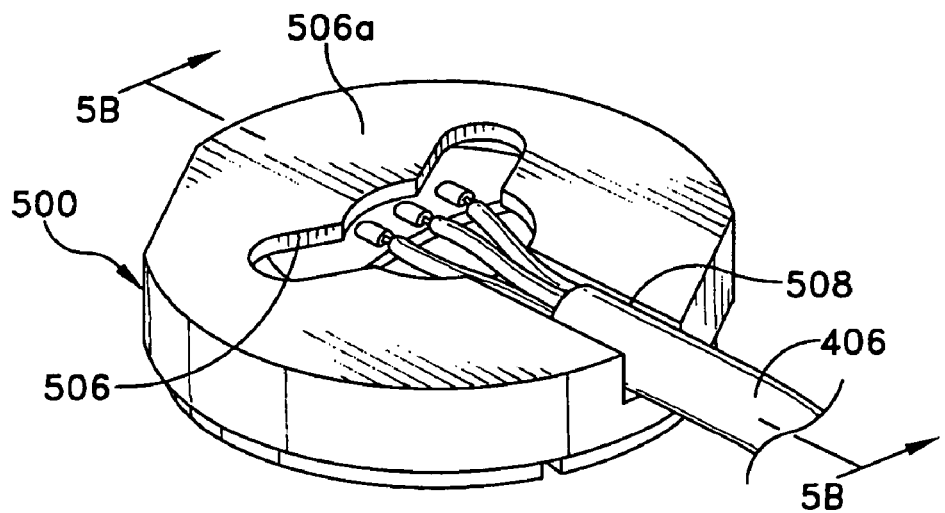
FIG. 5C is an isometric view of the sensor plate disclosed by FIG. 5B.

FIG. 5B discloses another embodiment of a receptacle (500) of insulating material receiving the sensor plate (100) and circuit board (402) and electrical cable (406). The receptacle (500) in FIG. 5B has the load bearing wall (502) with a stepped, recessed end (504) nesting the flange (108) of the sensor plate (100) and distributing the opposing force (118). The receptacle (500) has an opening (506) through an end wall (506a), and an open slot (508) through the wall (502). The electrical cable (406) extends either through the slot (508), as shown in FIG. 5B, or through the opening (506). The wall (502) and the end wall (506a) comprise a housing, and protect the circuit board (402) and the sensors (400) and the flexure beams (112).

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of making a load sensor plate, comprising:
   stamping spaced apart openings through a blank of resiliently deformable material to define flexure beams beside the openings;
   forming the blank with spaced apart columnar walls having a form resembling a cylinder joined by a web having the openings and the flexure beams wherein, an applied load exerted on one of the columnar walls is distributed among the flexure beams, and another of the columnar walls bears an opposing force that resists the applied load.

2. The method of claim 1, further comprising:
   forming the blank as a strip connecting with the load sensor plate.

3. The method of claim 1, further comprising:
   stamping the blank to form an outer periphery of the load sensor plate.

4. The method of claim 1, further comprising:
   forming said blank to provide said one of the columnar walls with a base to bear the applied load.

5. The method of claim 1, wherein said blank is so formed that an outer one of said columnar walls is circumferential about the web.

6. The method of claim 1, wherein said blank is so formed that the web is circumferential about an inner one of said columnar walls.

7. The method of claim 6, wherein said blank is so formed that an outer one of said columnar walls is circumferential about the web.

8. A method of making a load sensor plate for detecting strain comprising:
   stamping spaced apart openings through a blank of resiliently deformable material to define flexure beams beside the openings;
   forming the blank with spaced apart columnar walls joined by a web having the openings and the flexure beams whereby, an applied load exerted on one of the columnar walls is distributed among the flexure beams, and another of the columnar walls bears an opposing force that resists the applied load; and
   applying strain detecting sensors on the flexure beams to detect the applied load.

9. The method of claim 8, further comprising:
   connecting the sensors to a circuit board; and
   connecting an electrical cable to the circuit board.

10. A method of making a load sensor plate, comprising:
    stamping spaced apart openings through a blank of resiliently deformable material to define flexure beams beside the openings;
    forming the blank with spaced apart columnar walls joined by a web having the openings and the flexure beams; and
    forming the blank to provide said one of the columnar walls with a base to bear the applied load; and
    forming said one of the columnar walls and said base as a cup; and
    forming the cup with a central projection to receive the applied load as an off axis applied load.

* * * * *